Figure 1:
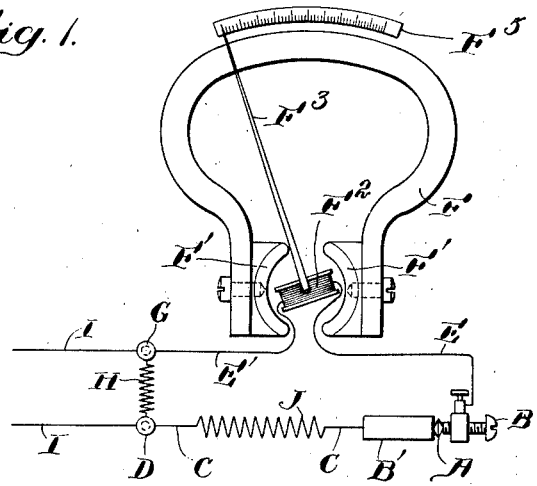

No. 879,061. PATENTED FEB. 11, 1908.
G. W. PIERCE.
RECTIFIER FOR ALTERNATING CURRENTS.
APPLICATION FILED JAN. 11, 1907.

Witnesses:
Geo. N. Goddard
K. A. Dugan

Inventor:
George W. Pierce
by Ira L. Fish
Attorney

UNITED STATES PATENT OFFICE.

GEORGE W. PIERCE, OF CAMBRIDGE, MASSACHUSETTS, ASSIGNOR TO MASSACHUSETTS WIRELESS EQUIPMENT COMPANY, OF BOSTON, MASSACHUSETTS, A CORPORATION OF NEW YORK.

RECTIFIER FOR ALTERNATING CURRENTS.

No. 879,061.      Specification of Letters Patent.      Patented Feb. 11, 1908.

Application filed January 11, 1907. Serial No. 351,773.

*To all whom it may concern:*

Be it known that I, GEORGE W. PIERCE, a citizen of the United States, and resident of Cambridge, Massachusetts, Middlesex county, have invented certain new and useful Improvements in Rectifiers for Alternating Currents, of which the following is a specification.

My invention relates to rectification of alternating currents or in other words to means for obtaining a direct current from an alternating current.

The current obtained may be truly continuous or it may be intermittent in character but it is direct in the sense that it may be used to operate direct-current machinery, will deflect a permanent magnet and be deflected thereby and may be measured by instruments such as are used for measuring direct currents when such instruments have been properly calibrated.

In practicing my invention I rectify currents from alternating sources by means of a substance which in some way not at present clearly understood permits a greater current to pass through it when the impressed electromotive force is in one direction than when the electromotive force is in the other direction. I have discovered that certain solid substances among which are carborundum, molybdonite, hessite, octahedrite, brookite, hematite, coovellite, possess this property of unilateral conductivity. Pyrolusite and psylomelan also possess this property. There are also a number of mineral oxids and sulfids of metals which have this property to a greater or less extent and some of these minerals might be successfully used as a permanent and reliable rectifier in electrical apparatus.

Carborundum possesses the property of unilateral conductivity to a marked extent and may be used with advantage as a rectifier for alternating currents especially in cases where permanence and uniformity of action are of importance or are essential. I therefore prefer to employ carborundum in practicing my invention although other solids possessing the property of unilateral conductivity to the requisite degree may be utilized.

In rectifying alternating currents by a solid which is unilaterally conductive the electrical connections with the rectifier may be made by placing the solid in a metallic clamp, by plating or coating parts with metal and connecting conductors thereto, or in any other suitable manner. The rectifier is put in electrical connection with the instrument or machine to be used and in connection with the alternating current leads. The connection may be a series or parallel connection and may be either direct or inductive.

For some purposes it may be found desirable to use a direct current or electromotive force superposed upon the rectifier in addition to the alternating current or electromotive force. I have also discovered that these solid rectifiers, and especially carborundum permanently retain the property of unilateral conductivity, and that the rectifying action is permanently uniform or practically so. I have also found that by reason of these properties I am enabled to combine the rectifying solid with other devices in producing instruments for measuring currents and voltage from alternating sources which are free from the well-known disadvantages and limitations of the alternating current measuring instruments as commonly constructed, and which are equal in precision and efficiency to direct current measuring instruments. The combinations and features by which such instruments are provided constitute important features of my invention.

For the purpose of illustration I have shown diagrammatically in the accompanying drawings several forms of apparatus or instruments embodying my invention.

Figure 2:
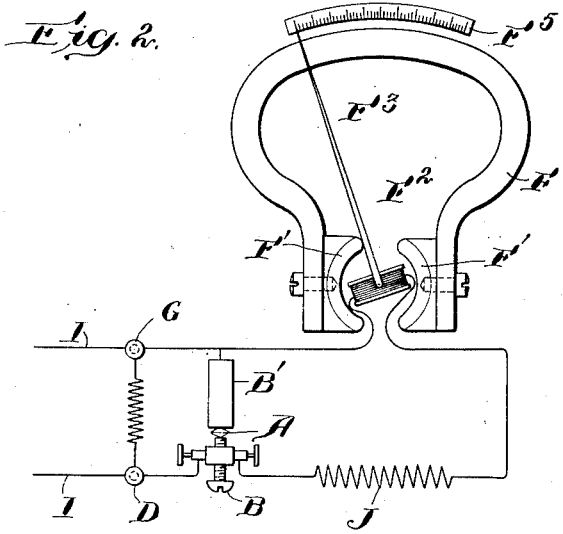
Figure 3:
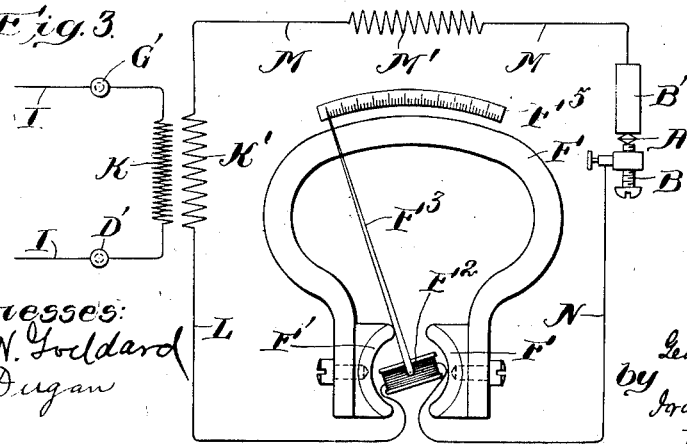

In these drawings—Figure 1 is a diagrammatic view of an apparatus or instrument which may be used for measuring the current in an alternating circuit. Fig. 2 is a similar view of a different form of apparatus or instrument which may be used for the same purpose; and Fig. 3 is a similar view of a different form of apparatus or instrument which is especially designed for measuring small alternating currents such for instance as are employed in telephony.

In the apparatus or instrument shown in Fig. 1 the rectifying means consists of a piece A of unilaterally conductive solid preferably one or more crystals of carborundum which is held in a metallic clamp. The jaws B B' of the clamp are insulated from each other and the jaw B is movable so that it may be adjusted in securing the rectifying solid A in place. The jaw B' is connected through a conductor C with a binding post D and the other jaw B is connected through a conductor E with a device operable by direct currents. This device in the instrument shown is of substantially the same construction as the indicating mechanism of well known direct-current ammeters or voltmeters. The indicating device consists of a permanent magnet F provided with pole pieces F' between which a coil $F^2$ is mounted. The coil $F^2$ is mounted to turn upon suitable pivots not shown and is yieldingly held in normal position by mean of light springs (not shown) in a well known manner. Connected with the coil $F^2$ is an indicating pointer or finger $F^3$ which coöperates with a scale $F^5$. The coil F' is connected through the conducting wire E with the rectifier and through the conductor E' with a binding post G. The binding posts G and D are connected by a resistance H through which the greater part of the current passing through the leads I I passes.

In using the instrument which is designed for measuring currents, the leads I I from an alternating source are connected with the binding posts G and D. A certain proportion of the current passes through the circuit leading from binding post D to the binding post G for instance. This current is rectified by the rectifier A so that a greater current flows in one direction through the circuit than through the other, the effect being the same as if a current equal to the difference in these two currents flowed in one direction through the circuit. When this current flows through the coil $F^2$ the coil is deflected to a certain degree depending upon the amount of current. By properly calibrating the indicating devices the pointer $F^3$ may be made to indicate the amount of current passing over the leads I I upon the scale $F^5$. The resistance H not only acts as a shunt for a greater part of the current, but also by its coöperation with the rectifier A it prevents a quivering or oscillating of the pointer when deflected. The reason for this is that when the current is in one direction the rectifier offers comparatively little resistance to the flow of the current, and considerable current passes through the coil of the indicating devices deflecting the pointer. When the current is in the opposite direction, however, the rectifier offers a high resistance to the flow of the current, and practically all the current goes through the shunt H. The pointer therefore remains practically at rest at the point to which it has been deflected.

I have found that the resistance of the unilaterally conductive solid such as carborundum decreases with an increase in the current passing through it and in order that the divisions on the scale $F^5$ may be substantially equal throughout the scale or the smaller divisions be located as desired, I prefer to introduce a resistance J in the circuit of the measuring instrument. By properly proportioning this resistance to the resistance of the circuit the deflections of the needle may be such for different currents that the divisions of the scale may be made substantially equal or distributed as desired throughout the length of the scale. The resistance J also acts or may act to counteract any slight variations in the resistance offered by the rectifier to the passage of the current due to changes in temperature. Carborundum, for instance, has a negative temperature coefficient, while the resistance has a positive temperature coefficient. That is to say, the resistance of the carborundum decreases with the increase of temperature, while the resistance of the resistance coil J increases with the increase of temperature. By properly proportioning the resistance, therefore, it may be made to substantially counteract any variations in the rectifier due to temperature changes. While the variations due to temperature changes may not be sufficient under many conditions to require elimination, their elimination may be important in delicate instruments for making very fine and accurate measurements, and are desirable in any case. In the case of delicate instruments for making accurate measurements, it is preferred to construct the resistance J of metal having a high temperature coefficient.

The range of the instrument may be increased by providing two or more resistances H either of which may be brought into the circuit in which case two scales will be provided as is usual in direct current measuring instruments.

An instrument having substantially the construction indicated in Fig. 1 but with the resistance H omitted or made of high value and properly calibrated may be used as a volt-meter.

In the apparatus shown in Fig. 2 the same construction of indicating devices are shown as are shown in Fig. 1 and this instrument as shown is also designed for measuring currents. In this construction the rectifying solid A and the indicating devices are connected in parallel instead of in series as in Fig. 1. In other respects the construction is substantially the same as the construction indicated in Fig. 1. When the instrument indicated in this figure is connected with the leads I I' from an alternating source, part of the current in the circuit between the binding posts G and D passes through the rectifying device and a part through the indicating instrument. Since more of the current passes through the rectifying device in one direction than in the other a greater current will flow through the indicating device in one direction than in the other and the result will be a rectified or substantially direct current passing through the instrument. In this case the resistance J may be introduced in the circuit for the same purpose for which it is introduced in the circuit in the construction of Fig. 1.

The instrument illustrated in Fig. 2 like the instrument illustrated in Fig. 1 may be used as a volt-meter by omitting the resistance H and properly calibrating the instrument so that the pointer and scale will indicate the difference in potential between the binding posts G and D when these binding posts are connected with the leads from an alternating source.

In Fig. 3 an instrument is illustrated in which the circuit of the rectifying device and indicating devices are inductively connected with the circuit to be investigated. In this construction the leads I I from the alternating source are connected with the binding posts G' D' and these binding posts are connected with opposite ends of the primary coil K of an induction coil. The secondary coil K' of the induction coil is in connection with the indicating devices and rectifier, the connection in the instrument indicated being a series connection. As shown one end of the secondary coil K' is connected through a wire L with the coil $F^2$ of the indicating device and the other end of the secondary coil is connected through a connecting wire M of a resistance M' with the jaw B' of the clamp which holds the rectifying solid A. The other jaw B of the clamp is connected through a conductor N with the coil $F^2$.

In using this instrument the alternating current through the primary K of the induction coil induces alternating currents in the secondary K' which are rectified by the rectifying device A so that the indicating devices are operated to indicate either the current or voltage of the circuit being investigated according to the calibration of the instrument.

In illustrating and explaining the various features of the invention no attempt has been made to indicate or describe the specific construction and arrangement of the parts referred to as such construction and arrangement is not deemed essential and may be whatever is best suited to the conditions under which the apparatus in which the invention is embodied is to be used.

Without attempting to point out the various constructions and arrangements in which the features of invention may be embodied, what I claim and desire to secure by Letters Patent is:—

1. In an electrical apparatus, a rectifier for alternating currents consisting of carborundum.

2. An electrical measuring instrument comprising a unilaterally conductive solid, calibrated indicating devices operable by small direct currents in electrical connection therewith, and means for electrically connecting a source of alternating current therewith, substantially as described.

3. An electrical measuring instrument comprising a unilaterally conductive solid, calibrated indicating devices operable by small direct currents connected in series therewith, and means for electrically connecting a source of alternating current therewith, substantially as described.

4. An electrical measuring instrument comprising a mass of carborundum, calibrated indicating devices operable by small direct currents in circuit therewith, and devices for making electrical connection between said circuit and a source of alternating current, substantially as described.

5. An electrical measuring instrument comprising calibrated indicating devices operable by small direct currents, a rectifying device in circuit therewith, and a resistance shunted with the rectifying device, substantially as described.

6. An electrical measuring instrument comprising calibrated indicating devices operable by small direct currents, a unilaterally conductive solid in circuit therewith, and a resistance shunted with said solid, substantially as described.

7. An electrical measuring instrument comprising calibrated indicating devices operable by small direct currents, a unilaterally conductive solid in circuit therewith, and a resistance in circuit with the solid for modifying its action on the indicating devices, substantially as described.

8. An electrical measuring instrument comprising calibrated indicating devices operable by small direct currents, a unilaterally conductive solid in circuit therewith, a resistance in circuit with the solid for modifying its action on the indicating devices, and a resistance shunted with the solid, substantially as described.

In witness whereof, I hereunto set my hand, this 4th day of January, 1907.

GEORGE W. PIERCE.

In presence of
IRA L. FISH,
KATHARINE A. DUGAN.